Patented Feb. 2, 1926.

1,571,181

UNITED STATES PATENT OFFICE.

FREDERICK WILLIAM ATACK, OF MANCHESTER, ENGLAND.

PROCESS FOR SULPHURIZING ORGANIC COMPOUNDS.

No Drawing.   Application filed January 22, 1923. Serial No. 614,290.

To all whom it may concern:

Be it known that I, FREDERICK WILLIAM ATACK, a subject of the King of Great Britain, residing in Manchester, in the county of Lancaster and Kingdom of England, have invented certain new and Improved Processes for Sulphurizing Organic Compounds, of which the following is a specification.

This invention relates to an improved process for sulphurizing organic compounds especially for producing dyestuffs. It is usual to perform such reaction in presence of a solvent for the polysulphide, e. g. water or ethyl alcohol although aniline and phenol have also been suggested.

According to my invention I use butyl alcohol or other inert organic liquid of similar boiling point (i. e. within 10° C.) which is a solvent for polysulphides. The liquid of such boiling point favorably influences the success of the reaction.

Butyl alcohol is particularly suitable since it is more inert than certain other solvents hitherto proposed, i. e. it is less susceptible to destruction by polysulphides it is miscible with water within limits and it is easily separable from water. The reaction occurs more readily with a liquid of higher boiling point than with a liquid of lower boiling point.

It is possible to use a wet paste of raw material since the butyl alcohol can be added thereto and the water can be readily separated. This is a great advantage because it allows an organic solvent to be used without making it necessary to dry and grind the paste.

Example.

A mixture containing 100 kilos of the indophnenol made from carbazol and p-nitroso phenol, 1200 kilos of normal butyl alcohol, 200 kilos of sodium sulphide (60%) and 150 kilos of powdered sulphur, is heated slowly to 100° C. and then under reflux for 50 hrs. After dilution with water and removing the butyl alcohol by distillation, the dyestuff is separated by filtration in the usual manner. It dyes cotton a blue shade from hydrosulphite vat and the dyeing are fast to washing, light, and to chlorine.

Pyridine can also be used alone or preferably in admixture with butyl alcohol.

The process is applicable to the manufacture of other dyes made by fusion of organic substances with polysulphides. The invention includes the dyestuffs so manufactured.

When applied to organic substances other than indo-phenols, the raw materials employed are those which are sulphurizable at temperatures near the boiling point of normal butyl alcohol namely 116.8° C.

I declare that what I claim is:—

1. The process of treating organic materials sulphurizable at a temperature about the boiling point of normal butyl alcohol which consists in heating the material with a sulpuhrizing reagent in presence of an inert solvent having a boiling point not far removed from the boiling point of normal butyl alcohol.

2. The process of treating organic materials sulphurizable at a temperature about the boiling point of normal butyl alcohol which consists in heating the material with a polysulphide in presence of normal butyl alcohol.

3. The process of treating organic materials sulphurizable at a temperature about the boiling point of normal butyl alcohol which consists in adding butyl alcohol to a wet paste of the organic material and then heating the mixture with a sulphurizing reagent.

4. The process of sulphurizing indophenols which consists in heating the indophenol with a polysulphide and butyl alcohol.

5. The process of sulphurizing indophenols which consists in mixing a wet paste of the indophenol with butyl alcohol and a polysulphide and heating the mixture.

6. Vat dyestuffs prepared by prolonged heating of indophenols with a polysulphide and butyl alcohol.

7. A process of treating organic materials sulphurizable at a temperature about the boiling point of normal butyl alcohol which consists in heating the material with a sulphurizing agent in presence of butyl alcohol.

8. Dyestuffs prepared by heating organic materials sulphurizable at a temperature about the boiling point of normal butyl alcohol with a sulphurizing agent in presence of normal butyl alcohol.

In witness whereof, I have hereunto signed my name this 18th day of January 1923.

F. W. ATACK.